United States Patent [19]

Rockandel et al.

[11] Patent Number: 5,209,774
[45] Date of Patent: May 11, 1993

[54] HYDROMETALLURGICAL PROCESS FOR TREATING MERCURY CONTAMINATED MUDS

[75] Inventors: Michael A. Rockandel, Richmond, Canada; Larry G. Twidwell, Butte, Mont.

[73] Assignee: Universal Dynamics Limited, Vancouver, Canada

[21] Appl. No.: 875,100

[22] Filed: Apr. 28, 1992

[51] Int. Cl.⁵ .............................................. C22B 43/00
[52] U.S. Cl. .................................................... 75/742
[58] Field of Search ........................................ 75/742

[56] References Cited

U.S. PATENT DOCUMENTS 3,639,118  2/1972  O'Grady ................................ 75/742
5,013,358  5/1991  Ball et al. .

Primary Examiner—Peter D. Rosenberg
Attorney, Agent, or Firm—Barriger & Oyen

[57] ABSTRACT

This invention relates to a hydrometallurgical process for the treatment of mercury contaminated muds. More particularly, this process pertains to a hydrometallurgical process for the treatment of Environmental Protection Agency designated K106 muds discharged from a mercury chlor-alkali plant. A hydrometallurgical process for the treatment of mercury containing solids comprising: (a) treating the solids in a first leach with acid and sodium hypochlorite to produce a leached product; (b) transferring the product from the first leach to a first washing thickener and thickening the leached product from the first leach; (c) transferring the underflow from the wash thickener to a second leach and treating the underflow product with acid and sodium hypochlorite to yield a second leached product; (d) transferring the product from the second leach to a second washing thickener and thickening the leached product from the second leach; and (e) transferring the product from the second wash thickener to a final dewatering process to yield a low mercury content.

30 Claims, 2 Drawing Sheets

HYDROMETALLURGICAL PROCESS FOR TREATING MERCURY CONTAMINATED MUDS

FIELD OF THE INVENTION

This invention relates to a hydrometallurgical process for the treatment of mercury contaminated muds. More particularly, this process pertains to a hydrometallurgical process for the treatment of Environmental Protection Agency designated K106 muds discharged from a mercury chlor-alkali plant.

BACKGROUND OF THE INVENTION

A significant but decreasing percentage of the world's chlorine and caustic soda comes from mercury amalgam cell chlor-alkali plants. These plants produce wastewater and contaminated sediments which must be treated before disposal to the environment. A common practice is to treat the wastewater with a combination of acidification and sulfidation to remove soluble mercury as mercuric sulfide. The wastewater is clarified prior to disposal while the solids containing mercuric and mercurous compounds as well as metallic mercury are disposed of in a hazardous landfill. The mercury content of the solids can vary significantly but is typically 1–6% total mercury.

Recently, the United States Environmental Protection Agency (EPA) has created a number of new rules which regulate the disposal of industrial waste streams. The rule making has identified special hazardous waste streams such as the chlor-alkali plant mercury contaminated waste-water treatment filter cake designated as K-106. The K-106 material is classified as a high mercury sub-category waste and will in the future be banned from land fill disposal.

The EPA has designated retort/roasting as the standard treatment technology (Best Demonstrated Available Technology—BDAT) for treating K-106 material. The technology is well established having been used extensively for the recovery of mercury from cinnabar ores and for the purification of contaminated mercury (triple distillation). There are, however, numerous problems associated with retorting of low concentration K-106 filter cakes. The most significant are:

1. Poor condenser recovery of mercury vapour from the low concentration retorter off-gas.
2. The condensed mercury is contaminated with sulfur and carbonaceous material making further refining to triple distilled quality difficult.
3. The high temperature chloride containing off-gas is highly corrosive.
4. It is necessary to recover sulfur from the off-gas.
5. The retort facility is expensive in terms of capital and operating cost.

U.S. Pat. No. 5,013,358, granted May 7, 1991, Ball et al., discloses and claims a method for the recovery of mercury from mercury-containing material. In that process, insoluble mercury or mercury salts in mercury-containing material are converted into a soluble form by controlled chlorination. The soluble forms of mercury in the chlorination solution are reduced with iron, preferably iron powder, to elemental mercury. After separation from the reduced solution, the solids from the reduction containing entrained mercury, are subjected to a separation procedure for the separation and quantitative recovery of substantially pure mercury. Separation by elutriation through a body of mercury is preferred. Prior to separation, the reduction solids may be kneaded for coalescence of fine mercury particles, followed by slurrying of the kneaded material. Any selenium in the reduced solution may be recovered in a reduction with a suitable reductant, preferably by adding strong sulfuric acid in the presence of the ferrous chloride formed in the preceding reduction, and excess sulfur dioxide. The process is carried out at ambient conditions, and the amount of liquid in the process is controlled. Substantially no mercury is discharged from the process in residues, or residual liquid.

The Ball et al. process utilizes chlorination in order to convert the insoluble mercury salts or mercury into soluble forms. The process does not disclose or teach concentrating mercury containing muds (K106 muds), treating the muds with acid and sodium hypochlorite in order to leach the muds, and then subsequently concentrating the mercury containing materials further and passing the materials through a second leach of acid and sodium hypochlorite. Furthermore, Ball et al. do not teach a countercurrent mud treatment process using overflow from the first and second leaches.

SUMMARY OF THE INVENTION

The invention pertains to a hydrometallurgical process for the treatment of mercury containing solids comprising: (a) treating the solids in a first leach with acid and sodium hypochlorite to produce a leached product; (b) transferring the product from the first leach to a first washing thickener and thickening the leached product from the first leach; (c) transferring the underflow from the wash thickener to a second leach and treating the underflow product with acid and sodium hypochlorite to yield a second leached product; (d) transferring the product from the second leach to a second washing thickener and thickening the leached underflow from the second leach; and (e) transferring the product from the second wash thickener to a final dewatering process to yield a low mercury content residue.

The overflow from the first wash thickener can be recycled to the first leach, the overflow from the second wash thickener can be recycled to the first wash thickener. The overflow from the first wash thickener can be treated with iron, and then filtered, to yield a mercury containing cement. Cementation filtrate can be recycled to process. A portion of the cement product filtrate is recycled to the second wash thickener. This low mercury stream is an effective washing solution but also transfers iron to the second leach which allows sodium hypochlorite addition to the acidic solution with minimal chlorine off-gassing. The remaining cement product solution is transferred to the sulfide reactor system for treatment prior to disposal. The overflow from the second wash thickener can be recycled to the first wash thickener.

The mercury containing solids can be first passed through a high capacity thickener before being transferred to the first leach. The overflow from the high capacity thickener can be filtered, backflushed, and the filtered product can then be recycled to the high capacity thickener.

The retention time of the first leach can be at least 15 minutes, conducted at a pH of about 6, and a solution potential of at least 900 mv. The retention time of the second leach can be at least 15 minutes, conducted at a pH of about 2, with a solution potential of at least 700 mv and a sodium chloride level at least about 5%. The temperature can be about 50° C.

The invention also pertains to a hydrometallurgical process for the treatment of mercury containing solids and liquids comprising: (a) treating the mercury containing solids and liquids in a sulfide reactor with acid and sodium sulfide to produce a product; (b) transferring the product from the sulfide reactor to a thickener to produce a thickened product; (c) transferring the thickened product from the high capacity thickener to a first leach, to which is added acid, and sodium hypochlorite to produce a first leached product; (d) transferring the first leached product from the first leach to a first countercurrent wash thickener to produce a wash thickened product; (e) transferring the wash thickened product from the first wash thickener to a second leach, to which acid and sodium hypochlorite is added to produce a second leached product; (f) transferring the second leached product from the second leach to a second countercurrent wash thickener to produce a second wash thickened product; and (g) washing the second wash thickened product from the second wash thickener to yield a low mercury containing residue.

The overflow from the second wash thickener can be transferred to the first wash thickener.

The overflow from the first wash thickener can be treated with iron in a cementation process, the resulting product being filtered to yield a mercury containing cement, the filtrate from the filter being recycled in part to the second wash thickener. The filtrate from the filter can be recycled in part to the first leach. A part of the filtrate from the filter can be recycled in part to the sulfide reactor.

Overflow from the sulfide reactor product thickener can be transferred to a backflushed Adams filter, the filtered product from the Adams filter being returned to the thickener.

BRIEF DESCRIPTION OF THE DRAWINGS

In drawings which illustrate specific embodiments of the invention but which should not be construed as restricting the spirit or scope of the invention in any way.

DETAILED DESCRIPTION OF SPECIFIC EMBODIMENTS OF THE INVENTION

The applicant has invented a hydrometallurgical process for the treatment of mercury containing K106 muds. The process can achieve a measure of performance equivalent to that achievable by the retorting of K106 muds.

Figure 1:
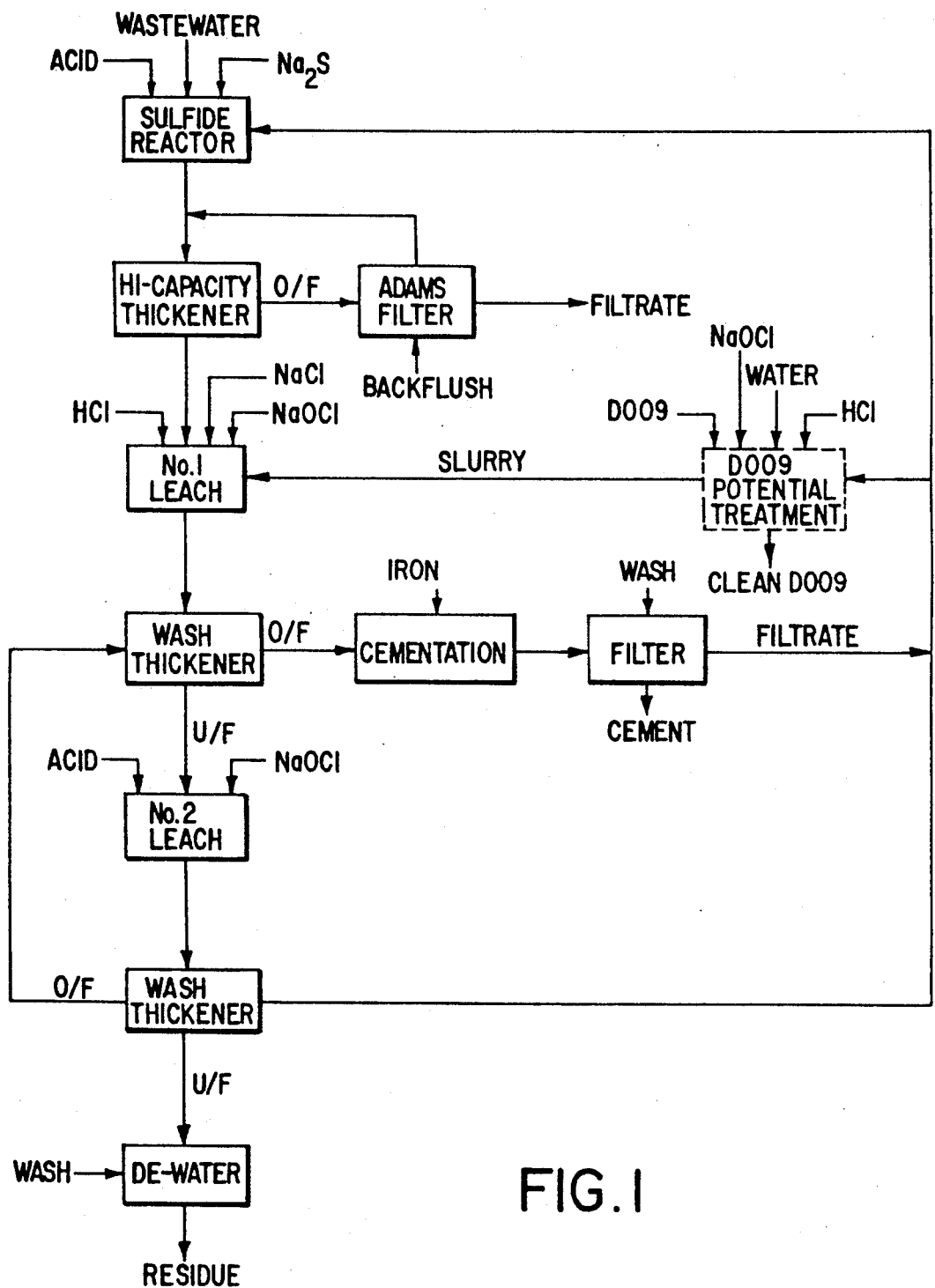
FIG. 1 represents a block diagram flow sheet of the mercury mud treatment process.

Referring to FIG. 1, which represents a block diagram flow sheet depiction of the mercury containing mud treatment process of the invention, the process operates as follows:

1. Waste water slurry from a sulfide reactor treated with acid and sodium sulfide is clarified in a high capacity thickener. The thickener splits the stream into an overflow which passes on to an Adams tube filter and an underflow mud (K106) which is transferred to a first leach.

2. The suspended solids in the overflow from the high capacity thickener are captured in the Adams tube filter and are then backflushed to the feed side of the high capacity thickener.

3. The underflow mud (K106) is directed to the first leach. A primary leach, with a retention time of 60 minutes, is conducted at pH=6 controlled by the addition of either HCl or $H_2SO_4$. The solution potential of the leach is raised to at least 900 mv by the addition of sodium hypochlorite. Temperatures are between about 20° to 100° C., preferably about 50° C. Sodium chloride in solution can be about 5–27% wt. preferably about 10%.

4. The leach product is passed to and thickened in a counter-current washing tray thickener. The overflow solution is directed to cementation while the settled underflow solids are transferred to a second leach.

5. The overflow solution from the tray thickener is contacted with iron in a rotating mill. Mercury is removed from the solution and is captured by a wash filter as a mercury-iron concentrate (cement).

6. The fine cement particles are filtered and washed to remove residual chloride and then packaged for shipment and reclamation at a mercury refiner.

7. The barren solution (filtrate) obtained from the cementation is less than 1 mg/l mercury. Part of the barren solution is recycled for use as the washing fluid in a second stage washing thickener. The remaining solution is purged by countercurrent recycling to the wastewater sulfide reactor.

8. The underflow solids from the wash tray thickener are directed to the second stage leach, with a retention time of at least 15 minutes, conducted at pH=2. Acid and sodium hypochlorite are added to the second stage leach to maintain a solution potential of at least 1,000 mv. Temperatures can be between about 20° to 100° C., preferably about 50° C. Solution concentration can be between about 5 to 27% wt. sodium chloride, preferably about 10%.

9. The product from the second stage leach is thickened in a second washing tray thickener. The washing fluid is a barren solution obtained from the cementation stage. The second washing tray thickener overflow is recycled to the first washing tray thickener as the washing fluid. The settled underflow solids from the second washing tray thickener are pumped to the final dewatering stage.

10. The final dewatering of the underflow from the second washing tray thickener is conducted on either a vacuum or pressure filter. The washing fluid is either water or a combined sodium sulfide and water wash. The residue at this stage has less than 260 ppm Hg and less than 0.200 mg/l TCLP, which meets EPA retort treatment standard.

Figure 2:
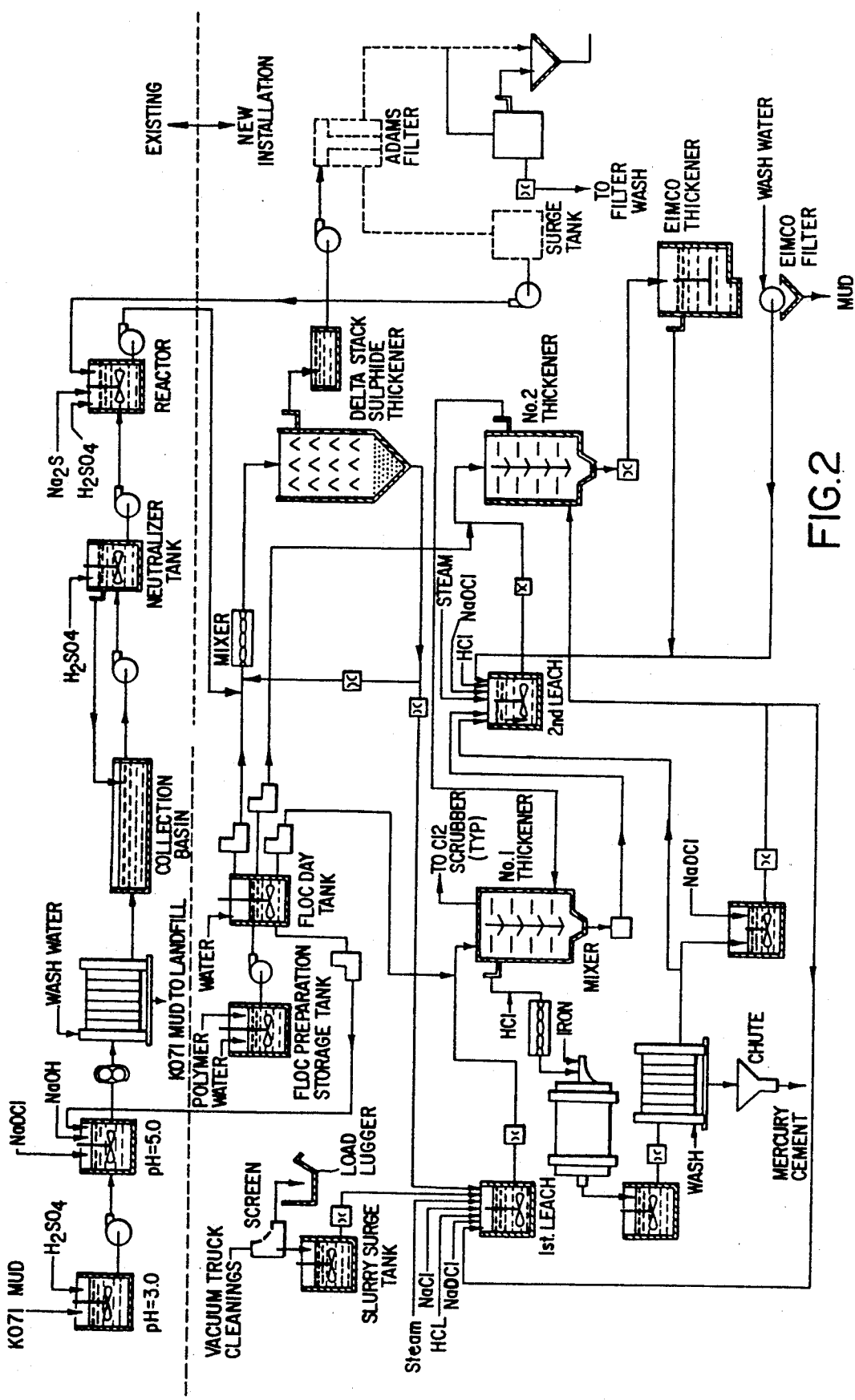
FIG. 2 represents a more detailed equipment and flow line representation of the mercury mud treatment process, adapted for use with an existing chlor-alkali plant.

FIG. 2 illustrates an equipment-type flow sheet representing the mercury mud treatment process of the invention. As illustrated in FIG. 2, the process is retrofitted to an existing K071 mud discharge from a conventional mercury chlor-alkali plant, comprising mixing tanks, filters, collection basins, neutralizer tanks, and a sulfide reactor treated with sodium sulfide and sulfuric acid. The discharge from the sulfide reactor is mixed with flocculant and transferred to a sulfide thickener. The overflow from the sulfide thickener is directed to a collection tank, and then pumped to an Adams filter. The overflow from the Adams filter is passed through a surge tank before being recycled to the sulfide reactor.

Optional lines are shown by means of dotted lines in FIG. 2.

The underflow from the sulfide thickener is pumped to the first leach. Steam, salt, hydrochloric acid and sodium hypochlorite are added to the first leach. The product of the first leach is pumped to the No. 1 thickener. Flocculant can be added to the product being introduced into the No. 1 thickener. The underflow from the No. 1 thickener is pumped to the second leach tank, where steam, sodium hypochlorite and hydrochloric acid are added.

The overflow from the No. 1 thickener is pH adjusted to about 2.0 through the addition of acid and flows to a cementation mill, where iron is added. The product from the cementation is filtered and washed, which produces a mercury cement as a product. The filtrate from the filter is split, and a portion is pumped to a mixing tank to which sodium hypochlorite is added. The contents of the mixing tank are pumped to the No. 2 thickener. The other portion of the filtrate can be partially recycled to the process or purged to the sulfide reactor for treatment prior to disposal. The leach product from the second leach is pumped to the No. 2 thickener. The overflow from the No. 2 thickener is recycled to the No. 1 thickener to create a countercurrent flow pattern.

The underflow from the No. 2 thickener is pumped to a final dewatering device such as a vacuum filter or a filter press. The filtrate from the dewatering step is recycled to the No. 2 leach. The filter cake provides a residue which has less than 260 ppm mercury and less than 0.200 mg/TCLP, thereby meeting EPA treatment standards.

The process has been tested both in the laboratory and in a continuous pilot plant at Montana College of Mineral Science and Technology, Butte, Mont., under the direction of co-inventor Larry Twidwell. Chemical analysis of the treated muds and extracts were performed at certified state laboratories. It was found that the muds from two separate chlor-alkali plants were successfully treated utilizing the process of the invention.

TEST RESULTS

A. Analysis of Source K106 Muds

Muds from two different chlor-alkali plants have been tested. An analysis of the source muds is shown in Table 1.

TABLE 1

| Sample | Test Samples Source | Type | % Hg |
|---|---|---|---|
| GP-1 | Georgia Pacific | K106 | 3.0 |
| GP-2 | Georgia Pacific | K106 | 3.3 |
| AM-1 | Georgia Pacific | Adams filter | 3.5 |
| CX-1 | Company X | K106 | 3.9 |

B. Analysis of Treated K106 Muds

Several configurations of the process of the invention have been examined. The following table provides a summary of results from the final configuration (two stage).

TABLE 2

| Test # | Leach Stages | Treated K106 Muds Hg (ppm) (EPA 245.1) | TCLP (mg/l) (EPA 1311) | Notes |
|---|---|---|---|---|
| DT-7 | 2 | 156 | | |
| DT-8 | 2 | 88 | | |
| DT-9 | 2 | 95 | 0.076 | |
| T-11A | 2 | 86 | 0.025 | |
| T-11B | 2 | 65 | <0.010 | 1 |
| T-12A | 1 | 81 | 0.156 | |
| T-12B | 2 | 118 | 0.158 | |
| T-14A | 2 | 56 | 0.044 | |
| T-14B | 2 | 39 | <0.010 | 1 |
| T-15A | 1 | 205 | | |
| T-15B | 2 | 144 | | |
| T-16 | 2 | 73 | | |
| T-17A | 1 | 56 | 0.076 | 2 |
| T-17B | 2 | 46 | — | 2 |
| CX-1 | 1 | 180 | — | 3 |
| CX-1A | 2 | 118 | 0.124 | 3 |

Notes:
1. Stabilized with sodium sulfide.
2. Adams filter mud.
3. Company X sample.
4. Testwork conducted at: Interwest Analytical Laboratories, Lindon, UT Montana Burea of Mines, Butte, MT Mountain State Energy, Butte, MT

C. Analysis of Mercury Cement

TABLE 3

| Mercury Cement SEM/EDX (%) | | | |
|---|---|---|---|
| Element | % Conc. | Element | % Conc. |
| Hg | 35.06% | Ca | nd |
| Fe | 36.98 | Cu | nd |
| Si | 3.76 | Al | nd |
| Cl | 8.83 | K | nd |
| Na | 6.62 | Ti | nd |
| Mg | 4.53 | V | nd |
| | | Mn | nd |
| | | Sn | nd |

Notes:
1. Only elements with identifiable peaks were reported.
2. There was no indication of sulfur which, if present, is clearly indentifiable with the SEM/EDX process.
3. As free mercury cannot be introduced into the SEM analyzer, the sample was baked at 120° C. for 2 hours. A significant loss of mercury could have occurred.
4. The cement was not washed.

BENEFITS

This process offers the following benefits:

(a) The process provides the ability to treat highly contaminated muds (K106) and soils to the levels of <260 ppm total mercury and <0.200 mg/l TCLP.

(b) The process provides an extracted mercury product (cement) that is suitable for immediate refinement. The mercury-iron concentrate can be easily refined by low temperature triple distillation. The mercury can then be recycled.

(c) The process provides a technology that is protective of human health and the environment. Mercury is extracted from low grade feed without the need for elevated temperature such as with retorting, thereby running the risk of losing mercury to the atmosphere.

(d) The process is particularly adapted for use with chlor-alkali plants and can be readily retro-fitted to such plants. Most of the chemicals used in the liquid state process are readily available to chlor-alkali operations. The process itself is similar to that used in the treatment of K071 muds. Materials and methods are familiar to chlor-alkali plant operators thus reducing the risk of accidents and release.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A hydrometallurgical process for the removal of mercury and mercury compounds from solid materials containing mercury and mercury compounds comprising:
   (a) treating the solid materials in a first leach with acid and sodium hypochlorite for a sufficient length of time to produce a first leached product having a reduced mercury and mercury compound content and a first by-product having an elevated mercury and mercury compound content;
   (b) transferring the first leached product from the first leach to a first wash thickener and thickening the first leached product from the first leach in order to generate a first thickened product and an overflow product;
   (c) transferring the first thickened product from the first wash thickener to a second leach and treating the first thickened product with acid and sodium hypochlorite for a sufficient length of time to produce a second leached product having a reduced mercury and mercury compound content and a second by-product having an elevated mercury and mercury compound content;
   (d) transferring the second leached product to a second wash thickener and thickening the second leached product from the second leach in order to generate a second thickened product and an overflow product; and
   (e) transferring the second thickened product from the second wash thickener to a final dewatering process to yield a low mercury content residue.

2. A process as claimed in claim 1 wherein the overflow product from the first wash thickener is recycled to the first leach.

3. A process as claimed in claim 1 wherein the overflow product from the second wash thickener is recycled to the first wash thickener.

4. A process as claimed in claim 1 wherein the overflow product from the first wash thickener is treated with iron, and then filtered, to yield a mercury containing cement.

5. A process as claimed in claim 2 wherein the overflow product from the second wash thickener is recycled to the first wash thickener.

6. A process as claimed in claim 1 wherein the solid materials containing mercury and mercury compounds are first passed through a preliminary thickener before being transferred to the first leach in order to produce a primary overflow product.

7. A process as claimed in claim 6 wherein the primary overflow product from the preliminary thickener is filtered and backflushed in order to produce a filtered product which is recycled to the preliminary thickener.

8. A process as claimed in claim 1 wherein the first leach has a retention time of at least about 15 minutes, said first leach being conducted at a pH of about 6, and a solution potential of at least about 900 mv, the first leach comprising at least about 5 percent by weight sodium chloride therein.

9. A process as claimed in claim 8 wherein the second leach has a retention time of at least about 15 minutes, said second leach being conducted at a pH of about 2, and a solution potential of at least about 700 mv, the second leach comprising at least about 5 percent by weight sodium chloride therein.

10. A hydrometallurgical process for the removal of mercury and mercury compounds form solid and liquid materials containing mercury and mercury compounds comprising:
    (a) treating the solid and liquid materials in a sulfide reactor with acid and sodium sulfide to produce a reaction product;
    (b) transferring the reaction product from the sulfide reactor to a preliminary thickener to produce a thickened product;
    (c) transferring the thickened product from the preliminary thickener to a first leach, to which is added acid and sodium hypochlorite to produce a first leached product;
    (d) transferring the first leached product from the first leach to a first wash thickener to product a first wash thickened product;
    (e) transferring the first wash thickened product from the first wash thickener to a second leach, to which is added acid and sodium hypochlorite to produce a second leached product;
    (f) transferring the second leached product from the second leach to a second wash thickener to produce a second wash thickened product; and
    (g) washing and filtering the second wash thickened product from the second wash thickener to yield a low mercury containing residue.

11. A process as claimed in claim 10 wherein the second wash thickener generates an overflow product which is transferred to the first wash thickener.

12. A process as claimed in claim 11 wherein the first wash thickener generates an overflow product which is treated with iron in a cementation process and filtered in a filter to yield a mercury containing cement and a filtrate, at least a part of the filtrate being recycled to the second wash thickener.

13. A process as claimed in claim 12 wherein at least a part of the filtrate is recycled to the first leach.

14. A process as claimed in claim 12 wherein at least a part of the filtrate is recycled to the sulfide reactor.

15. A process as claimed in claim 10 wherein the preliminary thickener generates an overflow product which is transferred to a backflushed filter in order to produce a filtered product, the filtered product from the filter being returned to the preliminary thickener.

16. A process as claimed in claim 1 wherein the acid in the first leach and second leach is selected from the group consisting of hydrochloric acid and sulphuric acid.

17. A process as claimed in claim 1 wherein sodium chloride is added to the first leach to increase the solubility of the mercury and mercury compounds.

18. A process as claimed in claim 1 wherein sodium chloride is added to the first leach to maintain a sodium chloride level in the first leach of between about 5 to 27 percent by weight.

19. A process as claimed in claim 1 wherein sodium chloride is added to the second leach to increase the solubility of the mercury and mercury compounds.

20. A process as claimed in claim 1 wherein sodium chloride is added to the second leach to maintain a sodium chloride level in the second leach of between about 5 to 27 percent by weight.

21. A process as claimed in claim 10 wherein the first leach has a retention time of at least about 15 minutes, the first leach being conducted at a pH of about 6, a solution potential of at least about 900 mv and a temperature between about 20° to 100° C., the first leach comprising at least about 5 percent by weight sodium chloride therein.

22. A process as claimed in claim 10 wherein the second leach has a retention time of at least about 15 minutes, the second leach being conducted at a pH of about 2, a solution potential of at least about 700 mv and a temperature of between about 20° to 100° C., the second leach comprising at least about 5 percent by weight sodium chloride therein.

23. A process as claimed in claim 10 wherein sodium chloride is added to the first leach to increase the solubility of the mercury and mercury compounds.

24. A process as claimed in claim 10 wherein sodium chloride is added to the first leach to maintain a sodium chloride level in the first leach of between about 5 to 27 percent by weight.

25. A process as claimed in claim 10 wherein sodium chloride is added to the second leach to increase the solubility of the mercury and mercury compounds.

26. A process as claimed in claim 10 wherein sodium chloride is added to the second leach to maintain a sodium chloride level in the second leach of between about 5 to 27 percent by weight.

27. A hydrometallurgical process for the removal of mercury and mercury compounds from solid and liquid materials containing mercury and mercury compounds comprising:

(a) treating the solid materials in a first leach with acid and sodium hypochlorite for at least about 15 minutes, the first leach containing at least about 5 percent by weight sodium chloride, with the treating of the solid and liquid materials in the first leach being conducted at a pH of about 6, a solution potential of at lea about 900 mv, and a temperature between about 20° to 100° C. in order to produce a first leached product having a reduced mercury and mercury compound content and a first by-product containing mercury and mercury compounds;

(b) transferring the first leached product to a first wash thickener and thickening the first leached product to produce a first thickened product;

(c) transferring the first thickened product from the first wash thickener to a second leach and treating the first thickened product therein with acid and sodium hypochlorite for at least about 15 minutes, the second leach containing at lea about 5 percent by weight sodium chloride, with the treating of the first leached product in the second leach being conducted at a pH of about 2, a solution potential of at lea about 700 mv, and a temperature between about 20° to 100° C. in order to produce a second leached product having a further reduced mercury and mercury compound content and a second by-product containing mercury and mercury compounds;

(d) transferring the second leached product to a second wash thickener and thickening the second leached product to produce a second thickened product; and (e) transferring the second thickened product from the second wash thickener to a final dewatering process to yield a residue having a mercury and mercury compound content of less than about 260 ppm total mercury.

28. A process as claimed in claim 27 wherein the acid in the first leach and second leach is selected from the group consisting of hydrochloric acid and sulphuric acid.

29. A process as claimed in claim 28 wherein sodium chloride is added to the first leach and the second leach to maintain the sodium chloride concentration of the first leach and the second leach at about 10 percent by weight.

30. A process as claimed in claim 29 wherein the temperature of the first leach and the second leach is about 50° C.

* * * * *